United States Patent [19]
Verdier

[11] 3,783,927
[45] Jan. 8, 1974

[54] TIRE AND RIM STRUCTURE FOR CONSTRUCTION EQUIPMENT

[75] Inventor: Henri Verdier, Beauregard-L'Eveque, France

[73] Assignee: Compagnie Generale Des Etablissements Michelin, raison sociale Michelin & Cie, Clermont-Ferrand, France

[22] Filed: Oct. 20, 1971

[21] Appl. No.: 190,892

[30] Foreign Application Priority Data
Oct. 20, 1970 France .............................. 70.37907

[52] U.S. Cl. ................ 152/409, 152/362, 152/405
[51] Int. Cl. ............................................ B60b 25/10
[58] Field of Search ................... 152/304, 362, 394, 152/395, 396, 397, 401, 402, 409, 405, 411

[56] References Cited
UNITED STATES PATENTS
3,463,213 8/1969 Wade ................................. 152/409
3,529,869 9/1970 Casey ................................. 152/409
3,237,991 3/1966 Hurst .............................. 301/13 SM Primary Examiner—Gerald M. Forlenza
Assistant Examiner—Lawrence J. Oresky
Attorney—Granville M. Brumbaugh et al.

[57] ABSTRACT

Each bead of a large pneumatic tire has permanently connected to its bottom an annular metal part serving as a bead seat and formed with a conical bearing surface. The rim for the tire has a fixed or movable axial stop member for each bead. Each axial stop member is formed with a conical stop surface, and the conical bearing surfaces are respectively engageable with the conical stop surfaces. Each pair of engaged bearing and stop surfaces is inclined with respect to the common axis of the tire and rim by an angle within the range of 10° to 30°. The structure prevents the tire and rim from slipping in rotation with respect to each other and is particularly adapted for use on construction equipment and the like.

4 Claims, 1 Drawing Figure

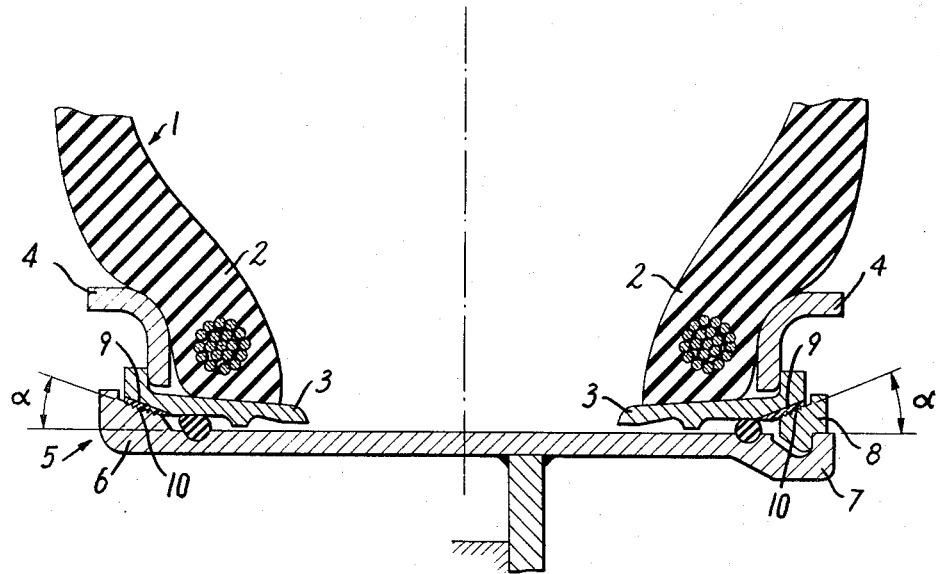

TIRE AND RIM STRUCTURE FOR CONSTRUCTION EQUIPMENT

BACKGROUND OF THE INVENTION

This invention relates to pneumatic tires and rims of large size for construction equipment and the like and, more particularly, to a novel and highly effective tire-rim structure by virtue of which the tire and rim are prevented from slipping in rotation with respect to each other when the equipment is in operation.

It has already been proposed to build tires the beads of which comprise, permanently fastened or wedged under their bottom, one or more annular metal parts which form bead seats, by means of which the tire rests on a rim base.

Experience has shown that the use of two bead seats independent of the rim base and capable of moving axially and in rotation around the axis of the wheel made the locking in rotation of the tire more difficult. The conventional way of assuring this locking in rotation, which consists in the use of keys, has proven inadequate. Upon the stopping and starting of the vehicle, the keys are subjected to shocks which cause ruptures or displacements; the keys tend to fail primarily because of shear and compression forces.

SUMMARY OF THE INVENTION

An object of the present invention is to remedy the problems of conventional structure noted above and, in particular, to provide a tire-rim structure by virtue of which the tire and rim are prevented from slipping in rotation with respect to each other when the construction equipment or the like on which the tire-rim structure is used is in operation.

In greater detail, an object of the invention is to improve the locking of a tire resting on its rim via two bead seats which are independent of the rim and to protect the locking keys by dampening the stresses to which they are subjected.

The foregoing and other objects are attained in accordance with the invention by the provision of a tire and rim in which each bead of the tire comprises, permanently connected to its bottom, an annular part made entirely or substantially entirely of metal serving as a bead seat and formed with a conical bearing surface intended to rest against a fixed or movable axial stop which is formed with a conical stop surface and forms part of the rim. The structure is characterized in that the conical bearing surface and the conical stop surface are inclined with respect to their common axis by an angle within the range of 10° to 30°.

Preferably, the conical bearing surface is covered by a plastic covering which adheres to metal, while the conical stop surface has a rough surface, or vice versa.

Because of the reduction of the taper angle of the engaged conical bearing and stop surfaces as compared to the angles conventionally employed, the compression of the bead seat on the axial stop substantially increases the counteracting torque which opposes the rotation of the tire with respect to the rim. One cannot, however, excessively reduce this taper angle, since this will make the freeing of the bead seat from the axial stop excessively difficult when it is necessary to change the tire. By selecting an angle of about 20° instead of the customary angle of close to 45°, the opposing torque resisting the undesirable rotational slippage of the tire and rim with respect to each other is multiplied by at least 2 or 3.

The presence of a plastic covering applied to a rough opposing surface further increases the torque which opposes the rotation of the bead seats with respect to the rim by anchoring the rough portions in the plastic covering.

Among the materials which permit the production of a plastic covering which adheres to metal, mention may be made of the polyamides, the halogenated polyethylenes and in particular the fluorinated and chlorofluorinated polyethylenes and epoxy resins.

BRIEF DESCRIPTION OF THE DRAWING

An understanding of other aspects of the invention can be gained from a consideration of the following detailed description of the preferred embodiments thereof, in conjunction with the appended drawing, wherein the sole figure is a fragmentary view in radial section of a tire and rim in accordance with the invention.

DESCRIPTION OF THE PREFERRED EMBODIMENTS

The drawing shows only the bead portions 2 of a pneumatic tire 1. To each bead, the base or bottom of which is inclined by an angle of 5° with respect to the tire axis, there are permanently connected a bead seat 3 and a side ring 4.

A rim 5 has a cylindrical rim bottom, a fixed axial stop 6, and a hook 7 containing a locking ring 8 which forms the movable axial stop.

The bead seats 3 on the one hand and the fixed axial stop 6 and movable axial stop 8 on the other come into contact along conical bearing and stop surfaces 9 and 10.

In accordance with the invention, the angle $\alpha$ formed by these surfaces with respect to the common axis of the tire and rim is within the range of 10° to 30°. In the example shown, the angle $\alpha$ is equal to 20°.

The conical bearing surfaces 9 of the bead seats 3 are provided with a polyamide or other high-friction, relatively soft covering, while the conical stop surfaces 10 of the fixed axial stop 6 and the movable axial stop 8 are roughened. In another embodiment of the invention, it is the conical stop surfaces 10 that are provided with a polyamide or other high-friction, relatively soft covering, while the conical bearing surfaces 9 are roughened.

Thus there is provided in accordance with the invention a novel and highly effective tire-rim structure preventing the tire and rim from slipping in rotation with respect to each other even when the tire-rim structure is used on construction equipment and the like generating very large torque. Many modifications of the preferred embodiments described above will readily occur to those skilled in the art in the light of the foregoing disclosure. For example, it would, of course, be possible, without going beyond the scope of the invention, to replace the bead seat 3 and the side ring 4 by a single part which combines the two of them. Accordingly, the invention is to be construed as including all the embodiments within the scope of the following claims.

I claim:

1. A pneumatic tire and a rim having a common axis, the tire comprising a pair of beads, each bead comprising, permanently connected to its bottom, an annular part made substantially entirely of metal serving as a bead seat and formed with a conical bearing surface, each of said annular parts being detachable from the rim, and the rim comprising an axial stop member for each bead, each axial stop member being formed with a conical stop surface, said conical bearing surfaces being respectively engageable with said conical stop surfaces and each pair of engaged bearing and stop surfaces being inclined with respect to the common axis of said tire and rim by an angle within the range of 10° to 30°.

2. Structure according to claim 1 wherein at least one of said axial stop members is permanently fixed with respect to the rim.

3. Structure according to claim 1 wherein at least one of said axial stop members is movable with respect to the rim.

4. A pneumatic tire and a rim having a common axis, the tire comprising a pair of beads, each bead comprising, permanently connected to its bottom, an annular part made substantially entirely of metal serving as a bead seat and formed with a conical bearing surface, and the rim comprising an axial stop member for each bead, each axial stop member being formed with a conical stop surface, said conical bearing surfaces being respectively engageable with said conical stop surfaces and each pair of engaged bearing and stop surfaces being inclined with respect to the common axis of said tire and rim by an angle within the range of 10° to 30°, one surface of each pair of engaged bearing and stop surfaces being formed of plastic and the other being formed of metal and being rough.

* * * * *